United States Patent
Zhao et al.

(10) Patent No.: US 11,138,527 B2
(45) Date of Patent: Oct. 5, 2021

(54) SYSTEMS AND METHODS FOR RESPONSIVE AND AUTOMATED PREDICTIVE PACKAGING ACQUISITION

(71) Applicant: COUPANG CORP., Seoul (KR)

(72) Inventors: Rubin Zhao, Shanghai (CN); Zhijun Xu, Shanghai (CN); Xiaohua Cui, Shanghai (CN); Jianmin Duan, Shanghai (CN)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 16/576,708

(22) Filed: Sep. 19, 2019

(65) Prior Publication Data

US 2021/0089975 A1    Mar. 25, 2021

(51) Int. Cl.
| | |
|---|---|
| *G06Q 30/00* | (2012.01) |
| *G06Q 10/04* | (2012.01) |
| *G06Q 10/08* | (2012.01) |
| *G06Q 30/06* | (2012.01) |

(52) U.S. Cl.
CPC ........... *G06Q 10/04* (2013.01); *G06Q 10/087* (2013.01); *G06Q 10/0832* (2013.01); *G06Q 10/0838* (2013.01); *G06Q 30/0643* (2013.01)

(58) Field of Classification Search
CPC .. G06Q 10/087; G06Q 10/04; G06Q 10/0832; G06Q 10/0838; G06Q 30/0643
See application file for complete search history.

(56) References Cited

U.S. PATENT DOCUMENTS

| | | | | |
|---|---|---|---|---|
| 3,862,666 A | * | 1/1975 | Muskat ................... | G01G 15/00 177/50 |
| 2002/0069186 A1 | * | 6/2002 | Moore ............. | G07B 17/00467 705/401 |

(Continued)

FOREIGN PATENT DOCUMENTS

| | | |
|---|---|---|
| JP | 2003-002417 | 1/2003 |
| JP | 2011-043948 | 3/2011 |

(Continued)

OTHER PUBLICATIONS

Gray et al., Design and operation of an order-consolidation warehouse: Models and application, European Journal of Operational Research, 1992 (discussing the managing and simulating of packaging). (Year: 1992).*

(Continued)

*Primary Examiner* — Patricia H Munson
*Assistant Examiner* — Uche Byrd
(74) *Attorney, Agent, or Firm* — Finnegan, Henderson, Farabow, Garrett & Dunner LLP

(57) ABSTRACT

The automatic packaging acquisition system includes at least one processor executing the instructions for performing operations. The operations may include receiving forecast data indicating a first expected number of packages over a first period of time required to ship an expected number of orders handled by a first fulfillment center, determining the historical scan events from a plurality of mobile devices associated with the first fulfillment center over a second period of time, determining a second number of packages based on the determined historical scan events, calculating a target quantity of packages based on the first expected number of packages and a value indicating cover days, instantiating a first electronic order for packages, based on the calculated target quantity, a current quantity of packages, an ordered number of packages, and the second number of packages; and send the first order to a remote computer system.

20 Claims, 10 Drawing Sheets

(56) References Cited

U.S. PATENT DOCUMENTS

| | | | |
|---|---|---|---|
| 2002/0174038 A1 | 11/2002 | Chien | |
| 2003/0216975 A1* | 11/2003 | Montey | G06Q 10/087 705/28 |
| 2006/0136237 A1* | 6/2006 | Spiegel | G06Q 10/08 705/330 |
| 2007/0050195 A1* | 3/2007 | Malitski | G06Q 10/04 705/333 |
| 2007/0094098 A1* | 4/2007 | Mayer | G06Q 30/0601 705/26.1 |
| 2012/0323638 A1* | 12/2012 | Knipfer | G06Q 10/083 705/7.37 |
| 2017/0323250 A1 | 11/2017 | Lindbo et al. | |

FOREIGN PATENT DOCUMENTS

| | | |
|---|---|---|
| JP | 2011-043948 A | 3/2011 |
| JP | 2017-534990 | 11/2017 |
| JP | 2019-512820 A | 5/2019 |
| WO | WO 2016/066859 A1 | 5/2016 |
| WO | WO 2019/041000 A1 | 3/2019 |

OTHER PUBLICATIONS

International Search Report and Written Opinion re PCT/IB2020/057578 dated Nov. 17, 2020 (11 pages).

Taiwanese Search Report dated Jan. 8, 2021 in Taiwanese Application No. 109127686 (2 pages).

Taiwanese Office Action dated Jan. 13, 2021 in Taiwanese Application No. 109127686 (30 pages).

AU First Examination Report in Application No. 2020260495 dated Dec. 2, 2020 (5 pages).

KR Preliminary Rejection in Patent Application No. 10-2019-0127970 dated Nov. 25, 2020 (10 pages).

Taiwan Intellectual Property Office issued Taiwan Office Action in Application No. 109127686, dated May 4, 2021 and English translation thereof (8 pages).

* cited by examiner

Favorites Application    login  Sign Up  Service center

[all]

My Account  Shopping Cart

Shipments  Fast Shipments  Christmas  Gold deals  Regular delivery  Events / Coupons  Planned Exhibition
Gift Cards Home > Food > Daily products / ice cream > Cheese > Fresh cheese > Mozzarella mozzarella cheese
285 Reviews    20,000 won

FREE Shipping
Tomorrow (Wed) 11/28 Arrival Guarantee
Weight per piece x Quantity : 1kg x 2 pieces

| 1 | Add to cart | Buy now |

- Country of origin: See product description
- Shelf Life: 2019-11-04
- Total quantity: 2
- Cheese form: crushed (powder)
- Item Number: 23532 - 3432551

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, |
|---|---|---|---|---|---|
| 6,500 won | 3,800 won | 6,460 won | 4,870 won | 2,370 won | 2,340 won |
| (54 won per 10g) | (86 won per 10g) | (285 won per 10g) | (108 won per 10g) | (80 won per 10ml) | (66 won per 10ml) |
| (3,721) | (545) | (1,330) | (3,193) | (2,552) | (245) |

| Product Details | Reviews (285) | Contact Us | Shipping & Returns |

Required notation information

| Type of food | Natural cheese / frozen products | Producers and Locations | Cheese Corp. / Republic of Korea |
|---|---|---|---|
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and Content reference | | nutrient | None |

FIG. 1C

11/28/2018  Shopping Cart

| General Purchasing (1) | Periodic Delivery (0) |

☑ Select All    Product Information    Item Amount   shipping fee

Rocket shipping products   free shipping

☑ 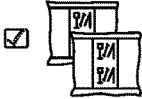 Mozzarella cheese, 1kg, 2 pieces
Tomorrow (Thursday) 11/29
Arrival guarantee (order before 12 pm)

20,510 won    [1 ▼]   free

| Even if you add other rocket shipping products, free shipping available | shipping Free  Order amount $20.00 |

☑ Select All (1/1)  [Delete all]  [sold out / discontinued products clear all]   [interest payment]

$__.00

[Continue shopping]   [Buy now]

Customers who bought this product also purchased

1/5

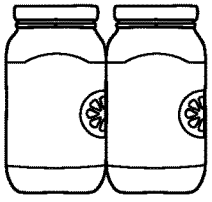      

Rosé spaghetti sauce,   Napoli Chunky Tomato   Grated Parmesan   Bacon and Mushroom Cream
600g, 2 pieces           Pasta Sauce,           cheese,           Pasta Sauce,
6,500 won            3,800 won          6,460 won     4,870 won
(54 won per 10g)         (86 won per 10g)       (285 won per 10g) (108 won per 10g)
          

FIG. 1D

SYSTEMS AND METHODS FOR RESPONSIVE AND AUTOMATED PREDICTIVE PACKAGING ACQUISITION

TECHNICAL FIELD

The present disclosure generally relates to computerized systems and methods for automated order management. In particular, embodiments of the present disclosure relate to inventive and unconventional systems relate to the automatic ordering of packaging material to be used for packaging purchased online products.

BACKGROUND

Determining the count of packages needed to package purchased products is as important as predicting the number of purchased products. Optimizing the package inventory aids in efficiently packaging the purchased products and also store the least number of packages to be used in the future. Current manual systems require human beings to check at regular intervals the number of packages available before making their best estimate of required packing count prior to placing the order. Even with computerized systems, human beings generally must manually input the number of packages to obtain a reasonable estimate.

These systems either underestimate to avoid unnecessary expenditure, causing one to place repeated orders which requires counting and entering the packages used or overestimate resulting in a large amount of space wasted in storing the packages.

Therefore, there is a need for improved methods and systems for an automated and accurate package ordering system.

SUMMARY

One aspect of the present disclosure is directed to a system for automatic packaging acquisition. The system includes at least one non transitory storage medium comprising instructions and at least one processor executing the instructions for performing operations. The operations may include receiving forecast data indicating a first expected number of packages over a first period of time required to ship an expected number of orders handled by a first fulfillment center, determining the historical scan events from a plurality of mobile devices associated with the first fulfillment center over a second period of time, determining a second number of packages based on the determined historical scan events, calculating a target quantity of packages based on the first expected number of packages and a value indicating cover days, instantiating a first electronic order for packages, based on the calculated target quantity, a current quantity of packages, an ordered number of packages, and the second number of packages; and send the first order to a remote computer system.

Another aspect of the present disclosure is directed to a method for automatic packaging acquisition. The method comprising: receiving forecast data indicating a first expected number of packages over a first period of time required to ship an expected number of orders handled by a first fulfillment center; determining the historical scan events from a plurality of mobile devices associated with the first fulfillment center over a second period of time determining a second number of packages based on the determined historical scan events, calculating a target quantity of packages based on the first expected number of packages and a value indicating cover days, instantiating a first electronic order for packages, based on the calculated target quantity, a current quantity of packages, an ordered number of packages, and the second number of packages, and sending the first order to a remote computer system.

Yet another aspect of the present disclosure is directed to a system for automatic packaging acquisition. The system may include at least one non transitory storage medium comprising instructions and at least one processor executing instructions for performing operations. The operations include receiving forecast data indicating an expected number of orders over a first period of time from a first fulfillment center; based on the forecast data, determining a first expected number of packages required to ship the expected number of orders, determining the historical scan events from a plurality of mobile devices associated with the first fulfillment center over a second period of time, determining a second number of packages based on the determined historical scan events, calculating a target quantity of packages based the first expected number of packages and a value indicating cover days; instantiate a first electronic order for packages, based on the calculated target quantity, a current quantity of packages, an ordered number of packages, and the second expected number of packages, and sending the first order to a remote computer system.

Yet another aspect of the present disclosure is directed to a system for automatic packaging acquisition. The system may include at least one non transitory storage medium comprising instructions and at least one processor executing instructions for performing operations. The operations include receiving forecast data indicating an expected number of orders over a first period of time from a first fulfillment center; based on the forecast data, determining a first expected number of packages required to ship the expected number of orders, determining the historical scan events from a plurality of mobile devices associated with the first fulfillment center over a second period of time, determining a second number of packages based on the determined historical scan events, calculating a target quantity of packages based the first expected number of packages and a value indicating cover days; instantiate a first electronic order for packages, based on the calculated target quantity, a current quantity of packages, an ordered number of packages, and the second expected number of packages, and sending the first order to a remote computer system, periodically searching a database storing electronic orders for confirmation of order electronic orders, when confirmed determining whether all packages associated with a confirmed electronic order have been received in a time period associated with the confirmed electronic order, marking the confirmed electronic order as closed and modifying the ordered number of packages by subtracting the un-received quantity of the confirmed electronic order, and during a next period, instantiating a new order based on the modified, when not confirmed, marking the first electronic order as closed, and subtracting the quantity of the unconfirmed electronic order from the ordered number of packages.

Other systems, methods, and computer-readable media are also discussed herein.

BRIEF DESCRIPTION OF THE DRAWINGS

FIG. 1C depicts a sample Single Display Page (SDP) that includes a product and information about the product along with interactive user interface elements, consistent with the disclosed embodiments.

FIG. 1D depicts a sample Cart page that includes items in a virtual shopping cart along with interactive user interface elements, consistent with the disclosed embodiments.

DETAILED DESCRIPTION

Figure 1A:
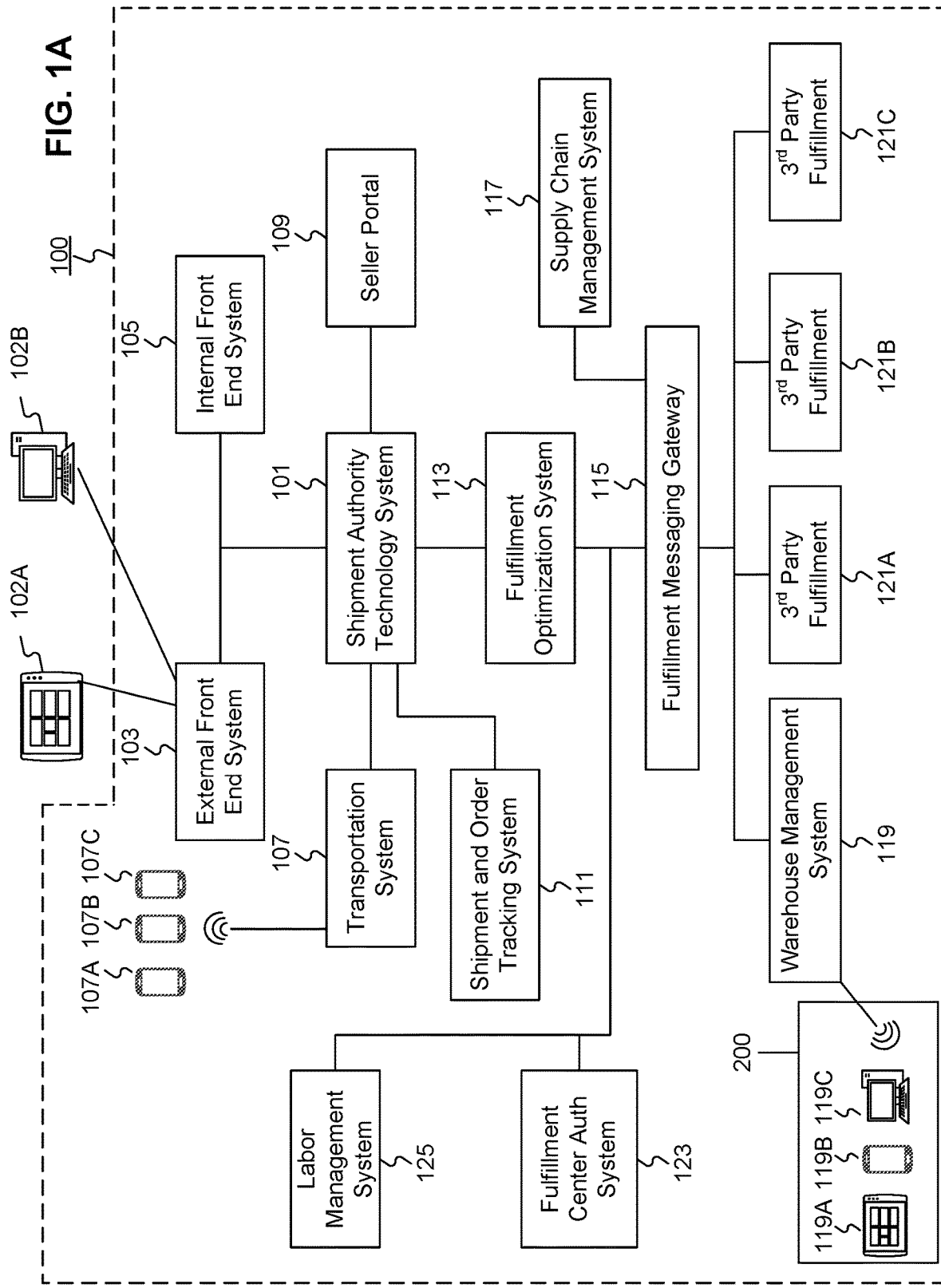
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for automated package order management.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in the package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, efficiency of the worker, or a speed of the worker.

Seller portal 109, in some embodiments, may be implemented as a computer system that enables sellers or other external entities to communicate electronically with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3rd party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count of products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3rd party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second login process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of the day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
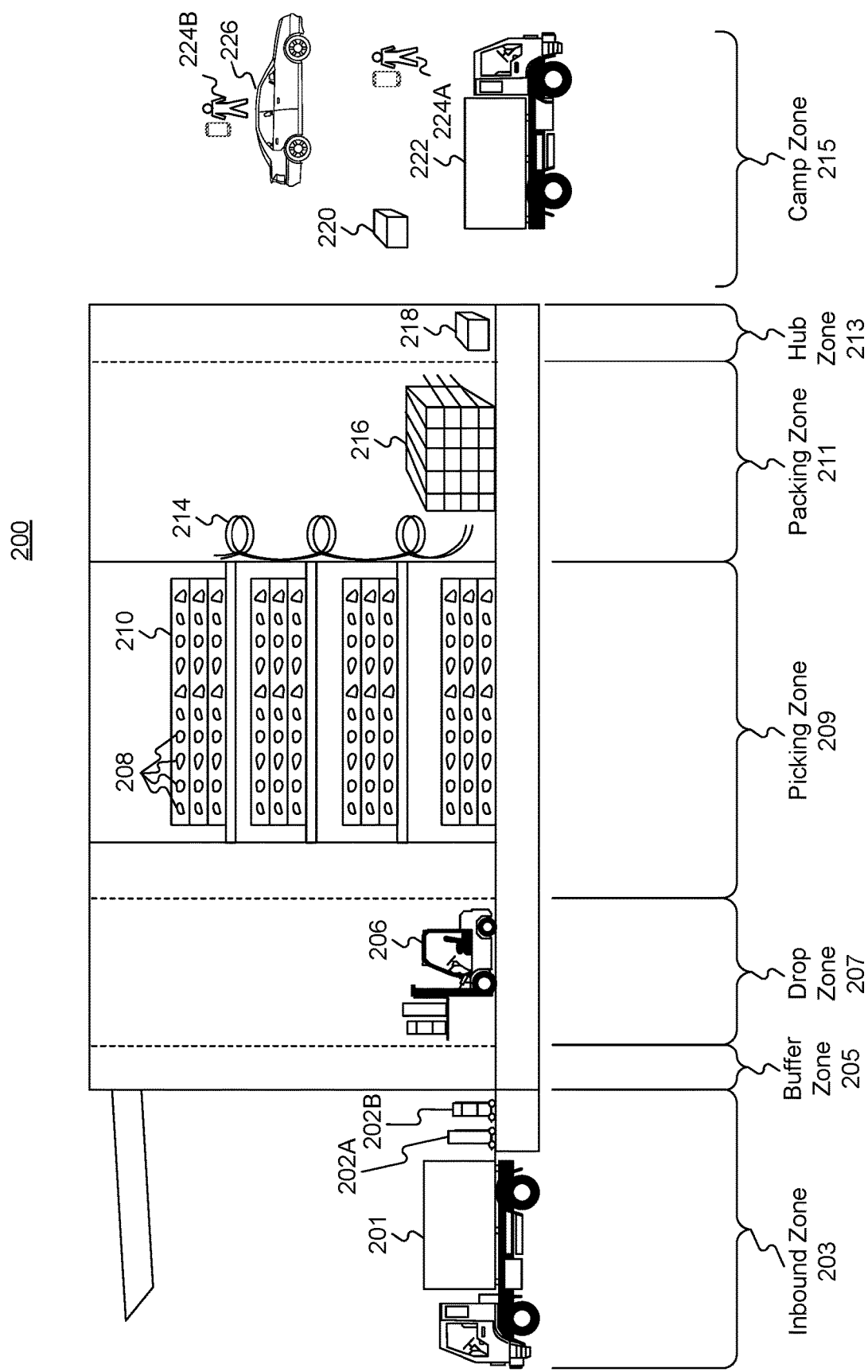
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which is depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, the transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as a computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In the exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
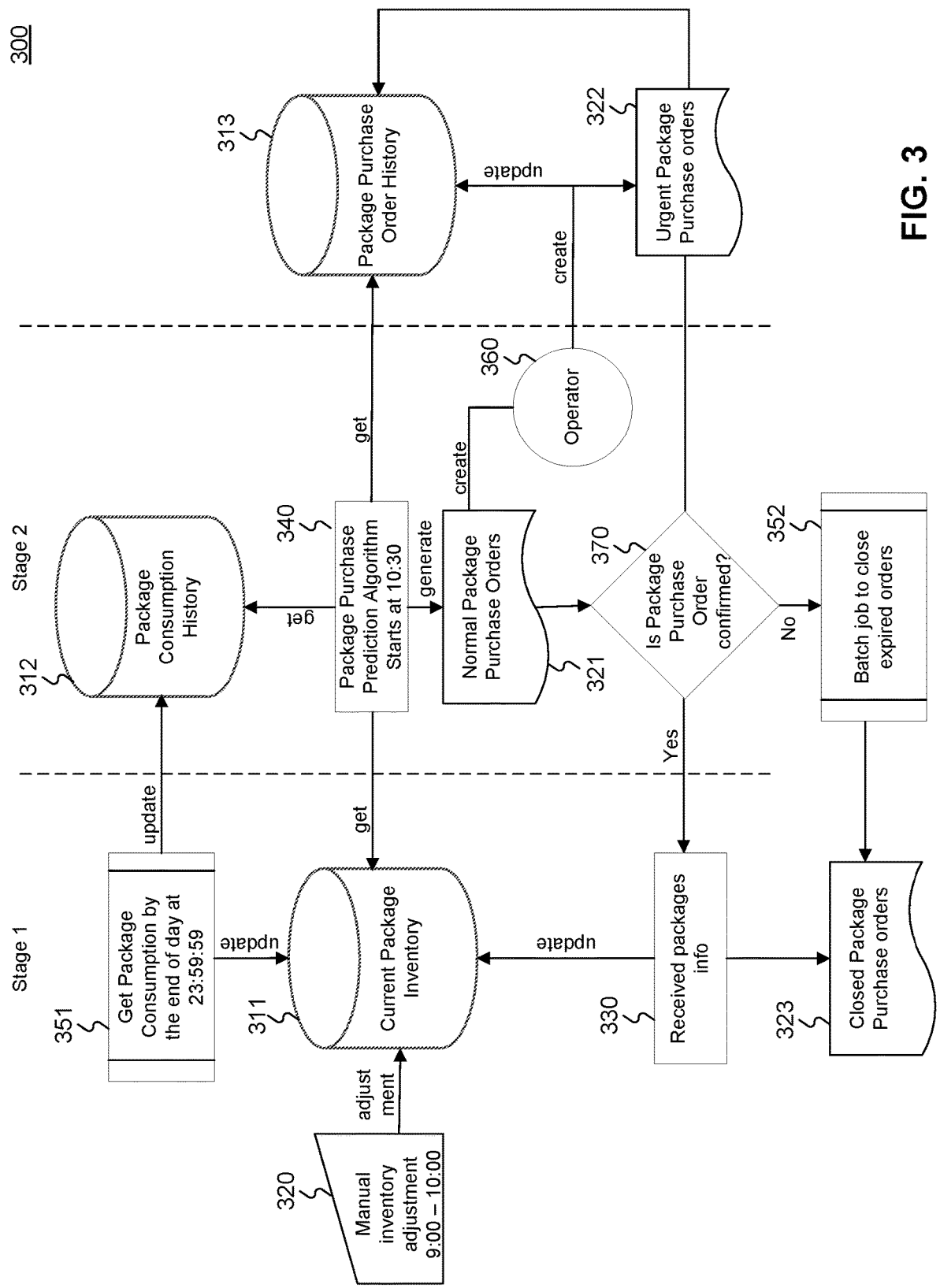
FIG. 3 is an illustrative flow diagram of an exemplary package ordering components accessing data to generate a box order request, consistent with the disclosed embodiments.

FIG. 3 is an illustrative flow diagram of an exemplary package purchase system 300 with various data storage components interacting to determine the number of packages to order at regular intervals of time, consistent with the disclosed embodiments. The package inventory management can occur across multiple fulfillment centers, per fulfillment center or, per seller. Warehouse management system 119 may manage the current packages inventory and orders placed for packages. Package inventory management may include one or more databases to store information about various stages of the packages. For example, in the exemplary package purchase system shown in FIG. 3, package purchase, storage, and usage information are stored in three databases, respectively: current package inventory 311, package consumption history 312 and package purchase order history 313. The three databases can be included in a single physical database and can be updated using devices 119 A-C. In some embodiments, each of the databases may be a collection of tables within the same database. The access to the databases may be limited to certain times of the day and certain individuals. In some embodiments the package purchase system tasks are performed by the warehouse management system 119 for purposes of illustration. It will be appreciated the tasks below could be performed one or more components of system 100. The example timings shown in FIG. 3 and described here are for example purposes and the system 300 is not limited to those timings or intervals of times. The system 300 may operate at any time and may be interacted at any interval time.

Warehouse management system 119 accesses the current package inventory 311 by placing a query at a certain predefined period of time. The current package inventory 311 is updated until the predefined period time by various sources, both manually and automated processes. The updates may occur real-time or at a specific period of time. For example, in FIG. 3, current package inventory 311 is modified by an employee of fulfillment center 200 through manual inventory adjustment 320 in between 9:00 AM-10:00 AM every day. In some embodiments, fulfillment center employees may modify the available inventory through an internal frontend system using devices 119A-C. The modification may include accessing a website listing count of various types of packages and updating them with a number. The internal website may be accessed by pointing the devices 119A-C to an URL directed to internal front end system 105. The update may be entered when an inventory count in the fulfillment center 200 differs from the entry in the database 311 beyond a certain threshold. In some embodiments, the updates may occur for certain events which involve the loss of package before using it in shipping products. For example, a package may have been destroyed before shipping the order in the packaging zone 211 and may not be captured by the scan events by the devices 107 A-C connected to the transportation system 107.

Current package inventory 311 may also receive real-time automated updates of new packages received from received packages info process 330. The received packages info 330 includes packages previously ordered by the warehouse management system 119. In some embodiments, current package 311 is also updated by a process 351 accessing consumption of packages from package consumption history 312 during the past 24 hours period. The process 351 may update the current package inventory at a specific period, for example, at the end of the day at 23:59:59 PM. The specific period may be defined by the last order moving to camp zone 215 for shipping or package zone 211 for packaging the ordered product(s).

In some other embodiments, process 351 may update current package inventory 311 which have not yet reached the packing zone 211 and are to be shipped today. The number of packages needed to ship the planned shipments for the day can be determined by fulfillment optimization system 113. The warehouse management system 119 may update the number of required packages in the package consumption history 312 before their actual consumption in the packaging zone 211.

In some embodiments, one or more of the updates described above need to occur before forecasting the packages needed in the future and placing an order. The various possible updates in FIG. 3 are labeled as stage 1 for this purpose. The forecast for package consumption and purchase occurs in stage 2 of the inventory management shown in FIG. 3. The package purchase prediction algorithm 340 accesses data from various sources to predict the number of packages to be purchased.

In FIG. 3, package purchase prediction algorithm 340 access data from three sources: the current package inventory 311 with update information in Stage 1 of the flow, package consumption history 312 and package purchase order history 313 to generate purchase order with the number of packages to be purchased as normal package purchase orders 321. Package purchase prediction algorithm 340 may execute multiple times in a day to generate multiple package purchase orders. Algorithm 340 may determine the requirement for a new purchase order based on the pattern of changes to package consumption history 312 and current package inventory 311. In some embodiments, machine learning models may be employed to interpret if the extreme consumption of packages is only for a certain period, and the overall consumption for the day still matches other days. In some embodiments, the machine learning models may be able to understand the type of products purchased to determine the need for more packaging and accordingly generate more package purchase orders.

Algorithm 340 may predict the number of packages to be purchased in a purchase order. Operator 360 may be required to create the normal purchase order 321. Operator 360 may also override the system to create additional package purchase orders as urgent package purchase orders 322. Operator 360 may be a monitoring service waiting for details of new orders. Operator 360 scans the generated normal orders list and communicated with a third-party service to place an order for packages listed in the normal orders 321. Operator 360 may call a different service for urgent orders 322. Operator 360 may communicate with services allowing placement of normal orders 321 and urgent orders 322 through an API call. Algorithm 340 may label different purchase order predictions as normal and urgent based on the patterns in package consumption history 312. Predicted and created purchase orders for packages results in an update sent to the package purchase order history 313 to help algorithm 300 access the latest data when making predictions. In some embodiments, algorithm 340 may place a lock on databases 311-313 before accessing the data from them. The package purchase orders may include one or more types of packages. In some embodiments, the algorithm 340 may run multiple times for multiple package types.

On completion of stage 1 and stage 2 of package purchase flow, the warehouse management system 119 may run batch processes 370 to determine the state of the previous purchase orders. Previous order states may be reviewed prior to determining the inventory and order generation stages. This includes reviewing previous orders and determining the confirmed and partially confirmed orders. As shown in FIG. 3, each purchase order is verified to see if the order is confirmed by a batch process. Upon confirmation, the batch process includes the received package in package info 330. On receipt of the purchased package, the order is considered closed and added to closed package orders 323. Addition to closed package purchase orders 323 may be processed by an employee of fulfillment center 200 and updated in package purchase order history 313. If the purchase is determined to be not confirmed by batch processes 370, then process 352 utilizes a set of rules to determine if the order is an expired or pending order. If a package purchase order is determined to have been expired, the order is added to the closed package purchase orders. The rules for determination of purchase order expiration may be different based on the type (normal vs. urgent) of purchase order. For example, urgent orders may be considered expired orders if they are not confirmed within a day and full received by the fulfillment center 200 but might wait for up to 3 days to mark normal orders as expired. Expired orders are also added to the closed package purchase orders 323. Such closed orders may require updating the current package inventory 311 if the inventory is updated immediately on placing an order. The update may require full or partial subtraction of certain type of packages based on the number of packages. The confirmation verification steps are optional, and the warehouse management system, 119 may never expire any past orders and instead ignore them.

Figure 4:
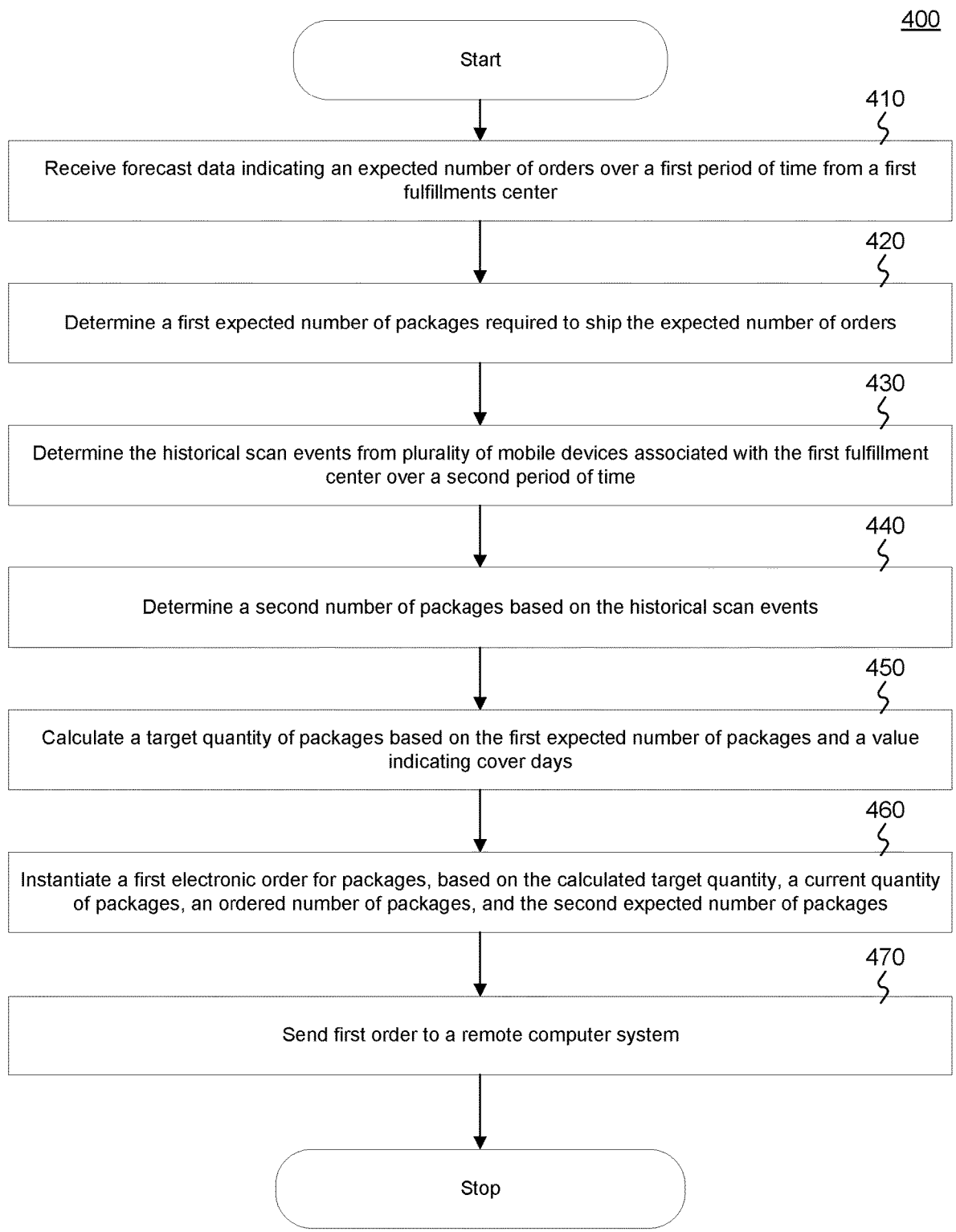
FIG. 4 is an illustrative flowchart of a method for placement of package purchase orders to efficiently package ordered products, consistent with the disclosed embodiments.

FIG. 4 is an illustrative flowchart of a method for placement of package purchase orders to efficiently package ordered products, consistent with the disclosed embodiments, the steps of method 400 may be performed by the warehouse management system 119 for purposes of illustration. It will be appreciated that the illustrated method can be altered to modify the order of steps, further include additional steps.

In Step 410, the Warehouse management system 119 receives a forecast of the product purchases offered via the external front end system 103 by supply chain management system 117 for a period of time. The period may be set to a specific interval of time, for example, a day or a week.

In Step 420, the warehouse management system 119 may determine the expected number of packages required to ship the product purchases forecasted in Step 410. The determination includes conversion of a maximum and a minimum number of packages required to ship the products by the promised product delivery date (PDD). Warehouse management system 119 may make the determination itself or delegate determination to fulfillment optimization system 113, which is aware of the availability of products at various fulfillment centers.

In Step 430, the warehouse management system 119 may determine the scan events from devices 107 A-C to understand the utilization of packages from previous purchases. In some embodiments, the warehouse management system 119 may request transportation system 107 to collect the scan data at regular intervals, for example, a day or a week and send it to the warehouse management system 119 to help determine the total number of packages needed in future to package the purchased products. The scan events may be stored real-time by the warehouse management system 119 in a database (not pictured) and querying the database to get a count of the scans over a period (e.g., a day or a week).

In Step 440, the warehouse management system 119 determines the number of packages based on the determined scan events by identifying the packaged packages in packaging zone. The scans may be one per purchase or package and the warehouse management system 119 may determine the method adopted in packaging a certain set of historically purchased products in the packaging zone 211 by employees within a warehouse.

In Step 450, the warehouse management system 119 calculates the number of packages required to be purchased based on the forecast of product purchases, past usages of packages at a fulfillment center (e.g., fulfillment center 200) and the number of packages currently available at the fulfillment center and the consumption of packages in the past. In some embodiments, the consumption history may be an average consumption of the packages over a week. In some other embodiments, the consumption history may take an average of package consumption same day across multiple weeks or months. In yet some other embodiments, both averaging techniques may be combined.

In Step 460, warehouse management system 119 prepares an order to purchase packages based on the number of required packages determined in step 450 to package the forecasted product purchases in an optimal manner.

In Step 470, the warehouse management system 119 sends the first order to a remote computer system to place the orders. In some embodiments, a remote system may identify any shipped products to have a real-time determination of packages availability at the fulfillment center. This determination may result in reducing the number of packages required to be purchased if the orders are part of the forecasted purchases. The current shipped products are considered to be part of the forecasted orders if they are after a certain time period, for example, post 9 AM on the date of the calculation when the delivery service begins. The determination of the number of packages to be purchased may be increased if the shipped products include orders which utilized the current count of packages.

Figure 5:
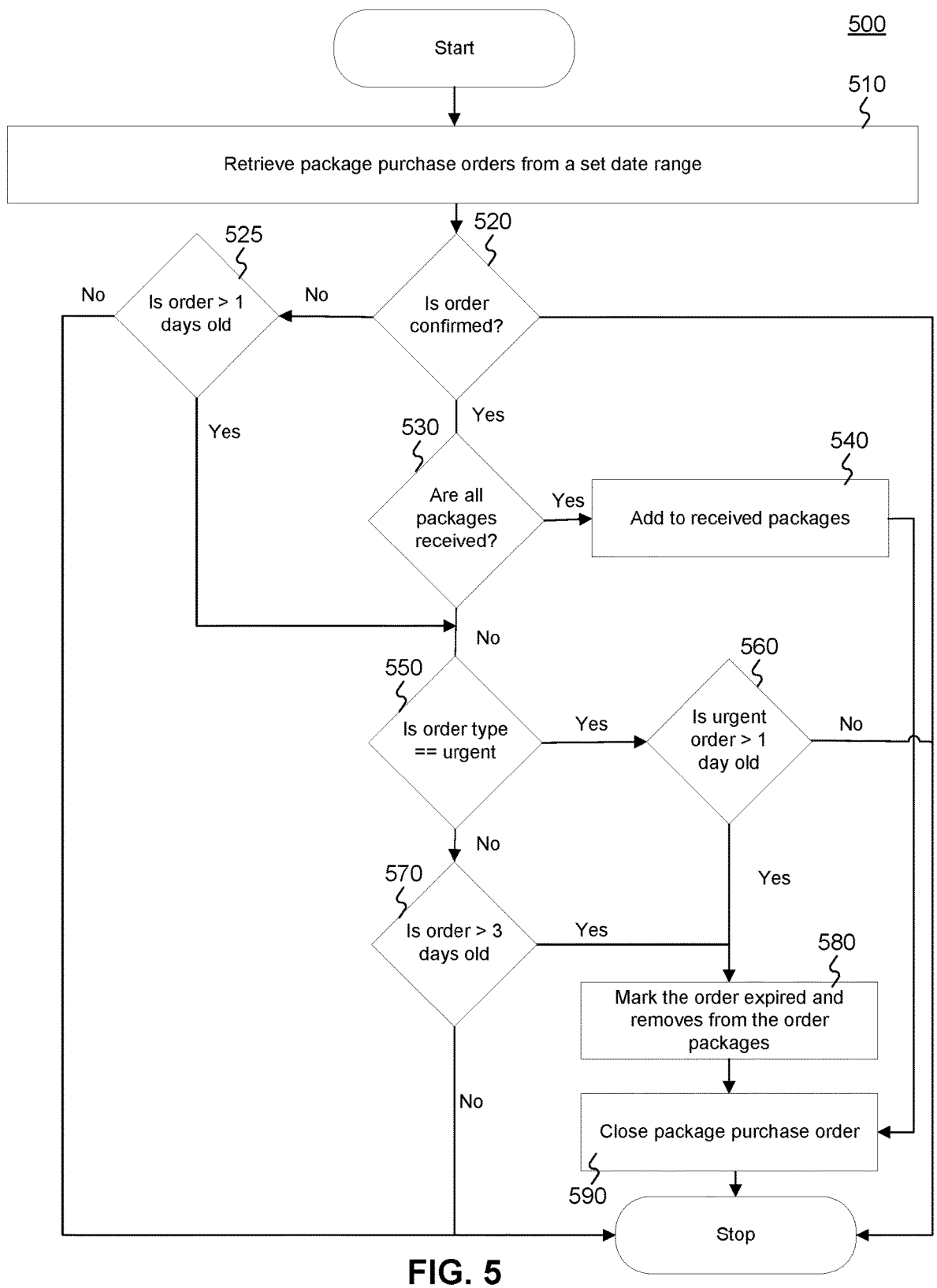
FIG. 5 is an illustrative flowchart of a method for monitoring package purchase orders consistent with the disclosed embodiments.

FIG. 5 is an illustrative flowchart of a method for monitoring package purchase orders consistent with the disclosed embodiments. In some embodiments, the steps of method 500 may be performed by the warehouse management system 119 for purposes of illustration. It will be appreciated that the illustrated method can be altered to modify the order of steps, or further include additional steps.

In Step 510, the warehouse management system 119 may retrieve package purchase orders from a set date range from package purchase order history 313 to determine if the ordered packages have been received and/or need to be ordered again. The chosen date range may depend on the forecast period for package consumption described in method 400. For example, if the forecast period for future usage of packages is set to one week, then the date range looks at all packages ordered within a week period from today. Package purchase order method 500 iterates through Steps 520 to 590 for each of the retrieved orders in step 510.

In Step 520, the warehouse management system 119 verifies if a package purchase order was confirmed. Confirmation of the order includes receipt of a notification from a third-party system. In some embodiments, the confirmation may depend on the receipt of the first set of packages. The ordered packages may be received by a fulfillment center 200 similar to products received in inbound zone 203 and described in FIG. 2 above. If a package purchase order is confirmed in one of these ways (answer yes), then method 500 may in some embodiments jump to Step 530, which is described below.

If the answer in Step 520 is no, method 500 may proceed to Step 525. In step 525, the warehouse management system 119 checks if the package purchase order is stale and was never confirmed. In FIG. 5 warehouse management system 119 determines stale purchase orders by check if the order has not been confirmed for more than a day. If the answer is yes, then method 500 may in some embodiments, jump to Step 550, which is described below. The warehouse management system 119 may in some embodiments update a confirmation field of the package purchase order in package purchase order history 313. If the answer in Step 525 is no, then warehouse management system 119 stops execution of rest of the steps of method 500 and in some embodiments may begin reviewing the next package purchase order from the list of purchase orders determined in Step 510.

In Step 530, the warehouse management system 119 checks whether all the packages of the confirmed package purchase order have been received by a fulfillment center 200. In some embodiments, employees of fulfillment center 200 may update the status of a package as received through devices 119A-C. If the answer to receipt of all packages is no, then method 500 may in some embodiments jump to Step 550, which is described below.

If the answer in Step 530 is yes, method 500 may proceed to Step 540. In Step 540, the warehouse management system 119 adds the packages listed in the package purchase order to received packages list. In some embodiments the warehouse management system 119 may send an update notification to current package inventory 311 for the packages added to the received packages list. The method 500 may in some embodiments then jump to step 590, which is described below. In following Steps 550-570 method 500 may determine whether to wait further for the packages of a package purchase order not yet received by a fulfillment center 200. The wait times may vary depending on the type of package purchase order. In the current embodiments the warehouse management system, 119 checks for two types of orders: normal and urgency. In some other embodiments, the number of types and the wait times may vary.

In Step 550, the warehouse management system 119 checks whether the package purchase order is an urgent order, if the answer is no, then method 500 may in some embodiments jump to Step 570, which is described below.

If the answer in Step 550 is yes, method 500 may proceed to Step 560. In Step 560, the warehouse management system 119 checks if the purchase order is older than a day. If the answer is yes, then method 500 in some embodiments may jump to Step 580, which is described below. If the answer in Step 560 is no, then warehouse management system 119 stops the execution of rest of the steps of method 500 and in some embodiments may begin reviewing the next package purchase order from the list of purchase orders determined in Step 510.

In Step 570, the warehouse management system 119 checks if the order is older than 3 days. If the answer in Step 570 is no, then warehouse management system 119 stops the execution of rest of the steps of method 500 and in some embodiments may begin reviewing the next package purchase order from the list of purchase orders determined in Step 510. If the answer is yes, then method 500 may proceed to Step 580. The number of wait days before considering a partially received package purchase order is considered expired may depend on the number of days of packages forecasted and ordered in method 400. For example, if the package purchase orders were based on a forecast for multiple weeks the wait times in Steps 560 and 570 can be longer.

In step 580, the warehouse management system 119 marks the package purchase order as expired and removes from package purchase order history 313.

In Step 590, the package purchase order is closed and added to the closed package orders list. The warehouse management system 119 closes both full received package purchase orders in Step 540 and expired orders determined in Step 580 as closed orders. Closed orders are not included in the purchase orders retrieved in Step 510.

Figure 6:
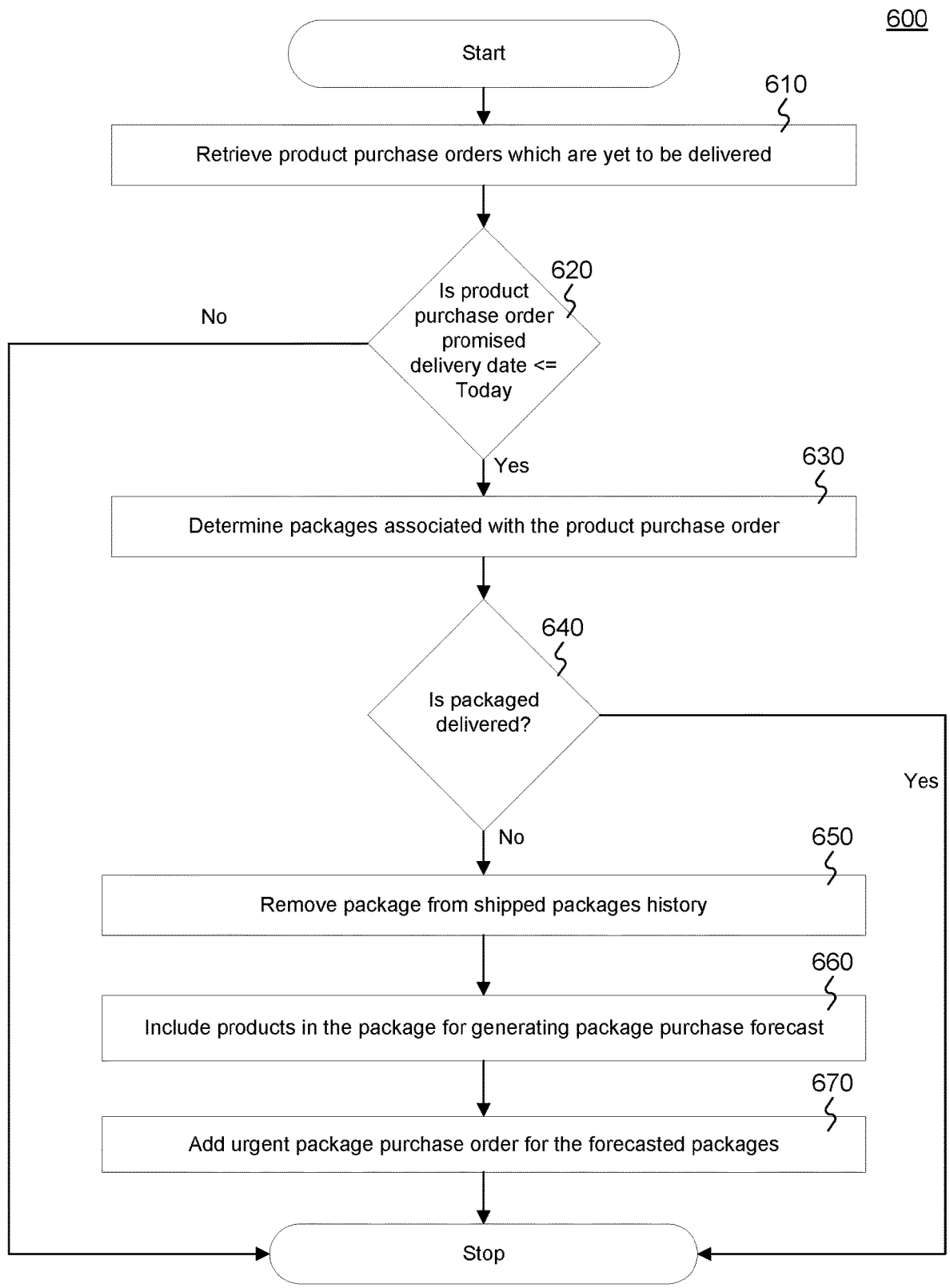
FIG. 6 is an illustrative flowchart of a method for placing an additional urgent product purchase orders, consistent with the disclosed embodiments.

FIG. 6 is an illustrative flowchart of a method for placing additional urgent product purchase orders, consistent with the disclosed embodiments. In some embodiments, the steps of method 600 may be performed by the warehouse management system 119 for purposes of illustration. It will be appreciated that the illustrated method can be altered to modify the order of steps, further include additional steps.

In Step 610, the warehouse management system 119 requests shipment and order tracking system to retrieve the product orders which have not yet been delivered. The retrieved list may also be filtered by a certain date range. For example, if the minimum delivery time is 2 days, no product orders made in the last 2 days need to be considered, and the date range does not include those dates. The warehouse management system 119 may also filter out those product orders which are in the camp zone 215 and will be delivered soon. The warehouse management system 119 may further filter product orders which were packaged in fulfillment center 200.

In Step 620, the warehouse management system 119 requests the SAT system 101 to determine the shipped orders among the filtered list of product orders from step 610 with a promised delivery date matching the current date. In some embodiments, SAT system 101 may monitor the promised delivery dates of the product orders and notify the warehouse management system 119 automatically on a failure to deliver by promised delivery date (PDD). If the answer is no, method 600 in some embodiments jumps to the end of the method and stops the execution of the method.

If the answer is yes, method 600 may proceed to Step 630. In Step 630, the warehouse management system 119 determines the packages associated with the product purchase order. In some embodiments, the warehouse management system 119 may query package consumption history 312 to access the packages associated with the products of a product purchase order.

In Step 640, the warehouse management system 119 determines if the package associated with the product purchase order has been delivered. The warehouse management system 119 may request shipment and order tracking system to retrieve the delivery status of the packages. If the answer is yes, method 600 in some embodiments jumps to the end of the method and stops the execution of the method.

If the answer is no, then method 600 may proceed to step 650. In Step 650, the warehouse management system 119 may remove packages not yet delivered and have PDD date as today or a day in the past from the list of shipped packages.

In Step 660, the warehouse management system 119 may include the products of the package to as additional products to the forecast of potential product purchase orders done by package purchase prediction algorithm 340. The undelivered products by PDD are included along with the forecast product purchases so as to optimize packaging all potential product purchase orders by fulfillment optimization system 113. In some embodiments, the undelivered products purchase orders are packaged separately, and the fulfillment optimization system 113 is used separately to identify optimal packaging for the undelivered products.

In step 670, in some embodiments, the warehouse management system 119 may generate a packaging purchase order. In some embodiments, the warehouse management system 119 may also label the order as an urgent package purchase order.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, the), Java, C++, Objective-C, HTML, HTML/AJAX combinations, XML, or HTML with included Java applets. Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computerized system for automatic packaging acquisition, comprising:
    at least one processor; and
    at least one non-transitory storage medium comprising instructions that, when executed by the at least one processor, cause the at least one processor to perform steps comprising:
        receive forecast data indicating a first expected maximum and minimum amount of packaging material predicted as required for shipping an expected number of orders to be handled by a first fulfillment center during a first time period, the forecast data determined by a machine learning model;
        determine historical scan events over a second time period from a plurality of mobile devices associated with the first fulfillment center;
        based on the determined historical scan events, determine a second amount of packaging material;
        determine a packaging method used by employees for a product associated with the orders handled by the first fulfillment center;
        calculate a target quantity of packaging material based on the first expected maximum and minimum amount of packaging material, the determined packaging method, a current quantity of packaging material at the fulfillment center, the second amount of packaging material, and a value indicating cover days;
        instantiate, using an application program interface (API) call, a first electronic order for packaging material, based on the calculated target quantity, and an ordered amount of packaging material; and
        send the first order to a remote computer system.

2. The system of claim 1, wherein the first time period is one week following the current time.

3. The system of claim 1, wherein the steps further comprise:
    after instantiating the first order, receive a request for additional packaging material;
    create a second electronic order for the additional packaging material, the communication indicating urgency; and
    send the second electronic order to the remote computer system.

4. The system of claim 1, wherein instantiating a first order comprises a periodic process of instantiating the first order; and wherein the steps further comprise:
    place a lock on a database storing electronic orders;
    after placing the lock on the database, search the database to determine confirmed electronic orders;
    determine whether all packaging material associated with a confirmed electronic order have been received in a time period associated with the confirmed electronic order;
    based on determining that at least one quantity of packaging material associated with the confirmed electronic order has not been received:
        mark the confirmed electronic order as closed; and
        modify the ordered amount of packaging material by subtracting the un-received quantity of the confirmed electronic order; and
    during a next period, instantiating a new order based on the modified ordered amount of packaging material.

5. The system of claim 1, wherein the steps further comprise:
    search a database storing electronic orders to determine electronic orders that have not been confirmed within a confirmation period;
    determine that the first electronic order has not been confirmed within an order confirmation time period;
    mark the first electronic order as closed; and
    subtract the quantity of the unconfirmed electronic order from the ordered amount of packaging material.

6. The system of claim 1, wherein the target amount of packaging material is computed based on adding the current quantity, a quantity of packaging material to be received over a third time period, and the forecast data quantity, and subtracting a value based on the average consumption of packaging material over the past week.

7. The system of claim 1, wherein the packaging material comprises at least one of boxes, bags, or wrap.

8. The system of claim 1, wherein the forecast data includes at least one: types of packages, sizes of packages, or expected time periods for shipping.

9. The system of claim 1, wherein the historical scan events over the second time period is an average number of scan events of the same time period spread over a fourth time period.

10. A computerized implemented method for automatic packaging acquisition, the method comprising:
    receiving forecast data indicating a first expected maximum and minimum amount of packaging material predicted as required for shipping an expected number of orders to be handled by a first fulfillment center during a first time period, the forecast data determined by a machine learning model;
    determining historical scan events over a second time period from a plurality of mobile devices associated with the first fulfillment center;

based on the determined historical scan events, determine a second amount of packaging material;
determining a packaging method used by employees for a product associated with the orders handled by the first fulfillment center;
calculating a target quantity of packaging material based on the first expected maximum, the determined packaging method, minimum amount of packaging material, a current quantity of packaging material at the fulfillment center, the second amount of packaging material, and a value indicating cover days;
instantiating, using an application program interface (API) call, a first electronic order for packaging material, based on the calculated target quantity and an ordered amount of packaging material; and
sending the first order to a remote computer system.

11. The computer implemented method of claim 10, wherein the first time period is one week following the current time.

12. The computer implemented method of claim 10, wherein the steps further comprise:
after instantiating the first order, receive a request for additional packaging material;
creating a second electronic order for the additional packaging material, the communication indicating urgency; and
sending the second electronic order to the remote computer system.

13. The computer implemented method of claim 10, wherein instantiating a first order comprises a periodic process of instantiating the first order; and wherein the steps further comprise:
placing a lock on a database storing electronic orders;
after placing the lock on the database, searching the database to determine confirmed electronic orders;
determining whether all packaging material associated with a confirmed electronic order have been received in a time period associated with the confirmed electronic order;
based on determining that at least one quantity of packaging material associated with the confirmed electronic order has not been received:
marking the confirmed electronic order as closed; and
modifying the ordered amount of packaging material by subtracting the un-received quantity of the confirmed electronic order; and
during a next period, instantiating a new order based on the modified.

14. The computer implemented method of claim 10, wherein the steps further comprise:
searching a database storing electronic orders to determine electronic orders that have not been confirmed within a confirmation period;
determining that the first electronic order has not been confirmed within an order confirmation time period;
marking the first electronic order as closed; and
subtracting the quantity of the unconfirmed electronic order from the ordered amount of packaging material.

15. The computer implemented method of claim 10, wherein the target amount of packaging material is computed based on adding the current quantity, a quantity of packaging material to be received over a third time period, and the forecast data, and subtracting a value based on the average consumption of packaging material over the past week.

16. The computer implemented method of claim 10, wherein the packaging material comprise at least one of boxes, bags, or wrap.

17. The computer implemented method of claim 10, wherein the forecast data includes at least one: types of packages, sizes of packages, or expected time periods of shipping.

18. The computer implemented method of claim 10, wherein the historical scan events over the second time period is an average number of scan events of the same time period spread over a third time period.

19. A computerized system for automatic packaging acquisition, comprising:
at least one processor; and
at least one non-transitory storage medium comprising instructions that, when executed by the at least one processor, cause the at least one processor to perform steps comprising:
receive forecast data indicating an expected number of orders from a first fulfillment center, the forecast data determined by a machine learning model;
based on the forecast data, determining a first expected maximum and minimum amount of packaging material predicted as required to ship the expected number of orders;
determine historical scan events over a second time period from a plurality of mobile devices associated with the first fulfillment center;
based on the determined historical scan events, determine a second amount of packaging material;
determining a packaging method used by employees for a product associated with the orders handled by the first fulfillment center;
calculate a target quantity of packaging material based on the first expected maximum and minimum amount of packaging material, the determined packaging method, a current quantity of packaging material at the fulfillment center, the second amount of packaging material, and a value indicating cover days;
instantiate, using an application program interface (API) call, a first electronic order for packaging material, based on the calculated target quantity and an ordered amount of packaging material; and
send the first order to a remote computer system.

20. The system of claim 19, wherein:
the machine learning model is configured to determine different types of orders initiated by user devices, wherein the forecasted data indicates expected types of orders with each type of order requiring a different type of packaging; and
the packaging method is determined based on a type of packaging associated with the product.

* * * * *